US011110353B2

(12) United States Patent
Somers et al.

(10) Patent No.: US 11,110,353 B2
(45) Date of Patent: Sep. 7, 2021

(54) DISTRIBUTED TRAINING FOR MACHINE LEARNING OF AI CONTROLLED VIRTUAL ENTITIES ON VIDEO GAME CLIENTS

(71) Applicant: Electronic Arts Inc., Redwood City, CA (US)

(72) Inventors: Caedmon Somers, Delta (CA); Jason Rupert, Port Coquitlam (CA); Igor Borovikov, Foster City, CA (US); Ahmad Beirami, Redwood City, CA (US); Yunqi Zhao, Sunnyvale, CA (US); Mohsen Sardari, Redwood City, CA (US); John Kolen, Foster City, CA (US); Navid Aghdaie, San Jose, CA (US); Kazi Atif-Uz Zaman, Foster City, CA (US)

(73) Assignee: Electronic Arts Inc., Redwood City, CA (US)

( * ) Notice: Subject to any disclaimer, the term of this patent is extended or adjusted under 35 U.S.C. 154(b) by 65 days.

(21) Appl. No.: 16/507,864

(22) Filed: Jul. 10, 2019

(65) Prior Publication Data
US 2021/0008456 A1      Jan. 14, 2021

(51) Int. Cl.
*A63F 13/67*      (2014.01)
*A63F 13/69*      (2014.01)
*A63F 13/58*      (2014.01)

(52) U.S. Cl.
CPC .............. *A63F 13/69* (2014.09); *A63F 13/58* (2014.09)

(58) Field of Classification Search
CPC .......... A63F 13/67; A63F 13/35; A63F 13/56; A63F 13/79; A63F 13/69; A63F 13/58;
(Continued)

(56) References Cited

U.S. PATENT DOCUMENTS 5,274,801 A    12/1993 Gordon
5,683,082 A    11/1997 Takemoto et al.
(Continued)

FOREIGN PATENT DOCUMENTS

CN        104657412 A       5/2015

OTHER PUBLICATIONS

Aponte et al., "Measuring the level of difficulty in single player video games," Elsevier, Entertainment Computing (2011) 205-213.
(Continued)

*Primary Examiner* — Ronald Laneau
*Assistant Examiner* — Ross A Williams
(74) *Attorney, Agent, or Firm* — Knobbe, Martens, Olson & Bear, LLP

(57) ABSTRACT

System and methods for utilizing a video game console to monitor the player's video game, detect when a particular gameplay situation occurs during the player's video game experience, and collect game state data corresponding to how the player reacts to the particular gameplay situation or an effect of the reaction. In some cases, the video game console can receive an exploratory rule set to apply during the particular gameplay situation. In some cases, the video game console can trigger the particular gameplay situation. A system can receive the game state data from many video game consoles and train a rule set based on the game state data. Advantageously, the system can save computational resources by utilizing the players' video game experience to train the rule set.

14 Claims, 6 Drawing Sheets

(58) Field of Classification Search
CPC .......... A63F 13/30; A63F 13/52; A63F 13/55; A63F 2300/807; A63F 2300/5546; A63F 2300/6009; A63F 2300/632; A63F 2300/558; G06N 20/00; G06N 3/08; G06N 3/006; G06N 3/02

See application file for complete search history.

(56) References Cited

U.S. PATENT DOCUMENTS

| | | | | |
|---|---|---|---|---|
| 6,106,395 | A * | 8/2000 | Begis | A63F 13/12 463/23 |
| 6,253,193 | B1 | 6/2001 | Ginter et al. | |
| 6,285,380 | B1 | 9/2001 | Perlin | |
| 7,390,254 | B2 | 6/2008 | Hirai | |
| 7,636,701 | B2 * | 12/2009 | Funge | A63F 13/10 706/47 |
| 8,100,770 | B2 | 1/2012 | Yamazaki et al. | |
| 8,142,282 | B2 | 3/2012 | Canessa et al. | |
| 8,267,764 | B1 | 9/2012 | Aoki et al. | |
| 8,398,476 | B1 | 3/2013 | Sidhu et al. | |
| 8,540,560 | B2 | 9/2013 | Crowley et al. | |
| 8,821,290 | B2 * | 9/2014 | Fujisawa | A63F 13/12 463/42 |
| 8,907,193 | B2 | 12/2014 | Cross et al. | |
| 8,914,251 | B2 | 12/2014 | Ohta | |
| 9,001,118 | B2 | 4/2015 | Molyneaux et al. | |
| 9,013,489 | B2 | 4/2015 | Evertt et al. | |
| 9,033,796 | B2 * | 5/2015 | Fujisawa | A63F 13/56 463/31 |
| 9,069,441 | B2 | 6/2015 | Jacob | |
| 9,616,329 | B2 | 4/2017 | Szufnara et al. | |
| 9,919,217 | B2 | 3/2018 | Aghdaie et al. | |
| 10,004,984 | B2 | 6/2018 | Voris et al. | |
| 10,105,603 | B2 | 10/2018 | Bucher | |
| 10,286,323 | B2 | 5/2019 | Aghdaie et al. | |
| 10,357,718 | B2 | 7/2019 | Aghdaie et al. | |
| 10,478,730 | B1 | 11/2019 | Burnett | |
| 10,569,176 | B2 | 2/2020 | D'angelo et al. | |
| 10,713,543 | B1 | 7/2020 | Skuin et al. | |
| 10,799,798 | B2 | 10/2020 | Aghdaie et al. | |
| 10,839,215 | B2 | 11/2020 | Somers et al. | |
| 2004/0067788 | A1 | 4/2004 | Angelopoulos | |
| 2004/0152512 | A1 | 8/2004 | Collodi et al. | |
| 2005/0130725 | A1 | 6/2005 | Creamer et al. | |
| 2007/0054717 | A1 * | 3/2007 | Youm | A63F 13/57 463/1 |
| 2007/0060364 | A1 * | 3/2007 | Osgood | G07F 17/32 463/42 |
| 2007/0066403 | A1 | 3/2007 | Conkwright | |
| 2007/0260567 | A1 * | 11/2007 | Funge | G06N 20/00 706/47 |
| 2008/0097948 | A1 * | 4/2008 | Funge | A63F 13/10 706/47 |
| 2008/0266250 | A1 * | 10/2008 | Jacob | G06F 3/04815 345/156 |
| 2008/0268961 | A1 | 10/2008 | Brook | |
| 2009/0202114 | A1 | 8/2009 | Morin et al. | |
| 2009/0307671 | A1 * | 12/2009 | White | A63F 13/10 717/149 |
| 2010/0144444 | A1 * | 6/2010 | Graham | A63F 13/352 463/42 |
| 2010/0302257 | A1 | 12/2010 | Perez et al. | |
| 2011/0295649 | A1 | 12/2011 | Fine et al. | |
| 2012/0083330 | A1 | 4/2012 | Ocko | |
| 2012/0115580 | A1 | 5/2012 | Hornik et al. | |
| 2012/0220376 | A1 | 8/2012 | Takayama et al. | |
| 2012/0233105 | A1 | 9/2012 | Cavallaro et al. | |
| 2012/0244941 | A1 | 9/2012 | Ostergren et al. | |
| 2012/0276964 | A1 | 11/2012 | Jones et al. | |
| 2012/0309520 | A1 | 12/2012 | Evertt et al. | |
| 2013/0178281 | A1 * | 7/2013 | Ayyar | A63F 13/12 463/30 |
| 2013/0316779 | A1 | 11/2013 | Vogel | |
| 2013/0316795 | A1 | 11/2013 | Vogel | |
| 2013/0342527 | A1 | 12/2013 | Molyneaux et al. | |
| 2014/0235346 | A1 | 8/2014 | Kim et al. | |
| 2014/0249961 | A1 | 9/2014 | Zagel et al. | |
| 2014/0274370 | A1 | 9/2014 | Shah | |
| 2015/0105161 | A1 | 4/2015 | Sumaki et al. | |
| 2015/0339532 | A1 | 11/2015 | Sharma et al. | |
| 2016/0005270 | A1 | 1/2016 | Marr et al. | |
| 2016/0067612 | A1 * | 3/2016 | Ntoulas | A63F 13/67 463/29 |
| 2017/0259177 | A1 | 9/2017 | Aghdaie et al. | |
| 2017/0312634 | A1 | 11/2017 | Ledoux et al. | |
| 2017/0365102 | A1 | 12/2017 | Huston et al. | |
| 2018/0001216 | A1 | 1/2018 | Bruzzo et al. | |
| 2018/0161673 | A1 | 6/2018 | Pasternack et al. | |
| 2018/0161682 | A1 | 6/2018 | Myhill | |
| 2018/0169526 | A1 | 6/2018 | Aghdaie et al. | |
| 2018/0243656 | A1 | 8/2018 | Aghdaie et al. | |
| 2019/0087965 | A1 | 3/2019 | Datta | |
| 2019/0184286 | A1 * | 6/2019 | Du | A63F 13/67 |
| 2019/0197402 | A1 * | 6/2019 | Kovacs | G06N 3/08 |
| 2019/0294881 | A1 | 9/2019 | Polak et al. | |
| 2019/0354759 | A1 * | 11/2019 | Somers | G06N 20/00 |
| 2019/0388789 | A1 | 12/2019 | Aghdaie et al. | |
| 2020/0078685 | A1 | 3/2020 | Aghdaie et al. | |
| 2020/0193671 | A1 | 6/2020 | Tamir | |
| 2020/0306640 | A1 | 10/2020 | Kolen et al. | |
| 2020/0342677 | A1 | 10/2020 | Molyneaux et al. | |
| 2021/0001229 | A1 | 1/2021 | Somers et al. | |
| 2021/0027119 | A1 | 1/2021 | Skuin et al. | |

OTHER PUBLICATIONS

Aristidou et al., "Inverse Kinematics Techniques in Computer Graphics: A Survey," Comp Graphics Forum, vol. 00:1-24 (2017).

Bengio, et al, Curriculum Learning, Proceedings of the 26th International Conference on Machine Learning, 2009, in 8 pages.

Biggs et al., "Creatures Great and SMAL: Recovering the Shape and Motion of Animals from Video", Dec. 6, 2018, Springer, Computer Vision—ACCV: Asian Conference on Computer Vision 2018, pp. 3-19.

Chen et al., "Visualization System for Animating Vertebrate Animal Models", 2012, IEEE, 2012 Conference on Technologies and Applications of Artificial Intelligence, pp. 244-249.

Chou et al., "Self Adversarial Training for Human Pose Estimation", Nov. 15, 2018, APSI PA, Proceedings, APSI PA Annual Summit and Conference 2018, pp. 17-30.

Davis et al., "A Sketching Interface for Articulated Figure Animation," Eurographics—SIGGRAPH Symp on Comp Animation (2003).

Donges, Niklas, Transfer Learning—Towards Data Science, Apr. 23, 2018, https://towardsdatascience.com/transfer-learning-946518f95666.

Du et al., "Hierarchical Recurrent Neural Network for Skeleton Based Action Recognition", Jun. 2015, IEEE, The IEEE Conference on Computer Vision and Pattern Recognition (CVPR) 2015, pp. 1110-1118.

Ho, et al, Generative Adversarial Imitation Learning, pp. 1-14, arXiv:1606.03476v1 [cs.LG]; Jun. 10, 2016.

Isola et al., "Image-to-Image Translation with Conditional Adversarial Networks," BAIR Lab, UC Berkeley (Nov. 26, 2018).

Kanazawa et al., "Learning Category-Specific Mesh Reconstruction from Image Collections", 2018, The European Conference on Computer Vision (ECCV), pp. 371-386.

Mehta et al., "Vnect: Real-time 3D Human Pose Estimation with a Single RGB Camera," ACM Transactions on Graphics, vol. 36:4 (Jul. 2017).

Pittman, "The Pac-Man Dossier," Gamasutra, downloaded on Jun. 1, 2018, available at <<https://web.archive.org/web/20161107115846/https://www.gamasutra.com/view/feature/3938/the_pacman_dossier.php?print=1>>.

Pruett, "Defining the All-Important Difficulty Curve," J of Ed, Comm & Value, vol. 8:1, Jan.-Feb. 2008, http://com mons.pacificu.edu/cg i/viewcontent.cg i?article=1002&context=inter08.

Shih et al., "Video-based Motion Capturing for Skelton-based 3D Models," National Taiwan University.

(56) References Cited

OTHER PUBLICATIONS

Shorten, "Image-to-Image Translation with Conditional Adversarial Networks," Pix2Pix, https://towardsdatascience.com/pix2pix.869c17900998?gi=e4c177e8a7c7 (Jan. 29, 2019).
Van de Panne, "Control for Simulated Human and Animal Motion," Dept Comp Sci, University of Toronto (1998).
Zweng et al., "Unexpected Human Behavior Recognition in Image Sequences using Multiple Features", Aug. 26, 2010, IEEE, 2010 20th International Conference on Pattern Recognition, pp. 368-371.

* cited by examiner

DISTRIBUTED TRAINING FOR MACHINE LEARNING OF AI CONTROLLED VIRTUAL ENTITIES ON VIDEO GAME CLIENTS

BACKGROUND

At least within the context of a video game, developing a set of rules that defines how characters or the environment behaves at a given time, state, and/or environment can require considerable computational resources. For example, using a trial-and-error approach such as reinforcement learning can require a high volume of trial and error episodes—or interactions with an environment—to derive the desired set of rules.

Traditionally, a game developer uses simulators to simulate these trial-and-error interactions with the environment. For example, a system or server can create tens, hundreds, or thousands of simulated environments for "training" or developing the rule sets.

SUMMARY OF EMBODIMENTS

The systems, methods and devices of this disclosure each have several innovative aspects, no single one of which is solely responsible for all of the desirable attributes disclosed herein. Details of one or more implementations of the subject matter described in this specification are set forth in the accompanying drawings and the description below.

Some embodiments of the present disclosure provide a method for collecting game state data associated with a particular runtime state of a video game. The method can be performed by one or more processors configured with computer-readable instructions. The method can include executing a game application on a client computing device. The game application can include game data. The game data can include a first rule set for governing actions of one or more non-player characters of the game application. Application of the first rule set during a first runtime state of the game application can cause the one or more non-player characters to perform one or more first actions. The method can further include, during runtime of the game application and responsive to an occurrence of a first runtime state of the game application, collecting first game state data associated with application of the first rule set during the first runtime state of the game application. The method can further include, during runtime of the game application, communicating, over the network, the first game state data. In some cases, an interactive computing system receives the first game state data from the client computing device and further receives other first game state data from other client computing devices.

The method of the preceding paragraph may also include any combination of the following features or steps described in this paragraph, among other features or steps described herein. The method can further include, during the runtime of the game application, determining that a runtime state of the game application is the first runtime state based at least in part on first conditions within the game application being satisfied. The method can further include, during the runtime of the game application, receiving, over a network, one or more data packets including at least a data collection rule. The data collection rule can correspond to the first runtime state of the game application. The method can further include, during the runtime of the game application, determining, based at least part on the data collection rule, to collect game state data associated with the first runtime state of the game application. The data packet can further include an exploratory rule set. Application of the exploratory rule set during the first runtime state of the video game can cause the one or more non-player characters to perform one or more second actions. The method can further include, during the runtime of the game application, and responsive to the determination that the video game is in the first runtime state, applying an exploratory rule set instead of the first rule set to cause the one or more non-player characters to perform the one or more second actions.

The method of any of the preceding two paragraphs may also include any combination of the following features or steps described in this paragraph, among other features or steps described herein. The method can further include, during the runtime of the game application, determining that the video game is in the first runtime state based at least in part on first conditions within the game application being satisfied. The other client computing devices can apply the exploratory rule set. The other first game state data can correspond to application of the exploratory rule set by the other client computing devices. The interactive computing system can update the exploratory rule set based at least in part on the game state data and the other game state data. The method can further include, during the runtime of the game application and based at least in part on a determination that one or more triggering conditions are satisfied and a determination that the video game is in the first runtime state, applying the first rule set instead of the exploratory rule set to cause the one or more non-player characters to perform the one or more first actions. The method can further include, during the runtime of the game application, altering gameplay of the video game to trigger the first runtime state of the video game.

Some embodiments of the present disclosure provide a computer-implemented method. The method can be implemented by an interactive computing system configured with specific computer-executable instructions. The method can include distributing, over a network, first data packets to a plurality of user computing systems. Each of the first data packets can include at least a data collection rule associated with a video game. The data collection rule can correspond to the first runtime state of the video game. Each of the plurality of user computing systems can be configured to, during runtime of a game application: receive, over the network, a first data packet of the first data packets; determine, based at least part on the data collection rule, to collect game state data associated with the first runtime state of the video game; responsive to a determination that the video game is in the first runtime state, collect first game state data associated with application of the first rule set during the first runtime state of the video game, and communicate, over the network, a second data packet including the first game state data. The method can further include receiving, over the network, the plurality of second data packets from the plurality of user computing systems.

The method of the preceding paragraph may also include any combination of the following features or steps described in this paragraph, among other features or steps described herein. Each of the first data packets further can include an exploratory rule set. Application of the exploratory rule set during the first runtime state of the video game can cause the one or more non-player characters to perform one or more second actions. Each of the plurality of user computing systems can be configured to, during runtime of a game application: responsive to the determination that the video game is in the first runtime state, apply the exploratory rule set instead of the first rule set to cause the one or more non-player characters to perform the one or more second actions. Each of the plurality of user computing systems can be configured to, during runtime of a game application: based at least in part on a determination that one or more triggering conditions are satisfied and a determination that the video game is in the first runtime state, apply the first rule set instead of the exploratory rule set to cause the one or more non-player characters to perform the one or more first actions. The method can further include updating the exploratory rule set based at least in part on the first game state data from the plurality of second data packets. Each of the plurality of user computing systems can be configured to, during runtime of a game application, alter gameplay of the video game to trigger the first runtime state of the video game.

Some embodiments of the present disclosure provide a system for collecting game state data associated with a particular runtime state of a video game. The system can include one or more processors configured with computer-readable instructions. The one or more processors can be configured to execute a game application on a client computing device. The game application can include game data. The game data can include a first rule set for governing actions of one or more non-player characters of the game application. Application of the first rule set during a first runtime state of the game application can cause the one or more non-player characters to perform one or more first actions. The one or more processors can be further configured to, during runtime of the game application: responsive to an occurrence of a first runtime state of the game application, collect first game state data associated with application of the first rule set during the first runtime state of the game application. The one or more processors can be further configured to, during runtime of the game application: communicate, over the network, the first game state data. In some cases, an interactive computing system can receive the first game state data from the client computing device and can receive other first game state data from other client computing devices.

The system of the preceding paragraph may also include any combination of the following features described in this paragraph, among other features described herein. The one or more processors can be further configured to, during the runtime of the game application, determine that a runtime state of the game application is the first runtime state based at least in part on first conditions within the game application being satisfied. The one or more processors can be further configured to, during the runtime of the game application, receive, over a network, one or more data packets including at least a data collection rule. The data collection rule can correspond to the first runtime state of the game application. The one or more processors can be further configured to, during the runtime of the game application, determine, based at least part on the data collection rule, to collect game state data associated with the first runtime state of the game application. The data packet can further include an exploratory rule set. Application of the exploratory rule set during the first runtime state of the video game can cause the one or more non-player characters to perform one or more second actions. The one or more processor can further configured to, during the runtime of the game application: responsive to the determination that the video game is in the first runtime state, apply an exploratory rule set instead of the first rule set to cause the one or more non-player characters to perform the one or more second actions.

The system of any of the preceding two paragraphs may also include any combination of the following features described in this paragraph, among other features described herein. The one or more processors can be further configured to, during the runtime of the game application: based at least in part on a determination that one or more triggering conditions are satisfied and a determination that the video game is in the first runtime state, apply the first rule set instead of the exploratory rule set to cause the one or more non-player characters to perform the one or more first actions. The one or more processors can be further configured to, during the runtime of the game application: alter gameplay of the video game to trigger the first runtime state of the video game.

Although certain embodiments and examples are disclosed herein, inventive subject matter extends beyond the examples in the specifically disclosed embodiments to other alternative embodiments or uses, and to modifications and equivalents thereof.

BRIEF DESCRIPTION OF THE DRAWINGS

Throughout the drawings, reference numbers are re-used to indicate correspondence between referenced elements. The drawings are provided to illustrate embodiments of the subject matter described herein and not to limit the scope thereof.

DETAILED DESCRIPTION OF EMBODIMENTS

Introduction

Figure 1:
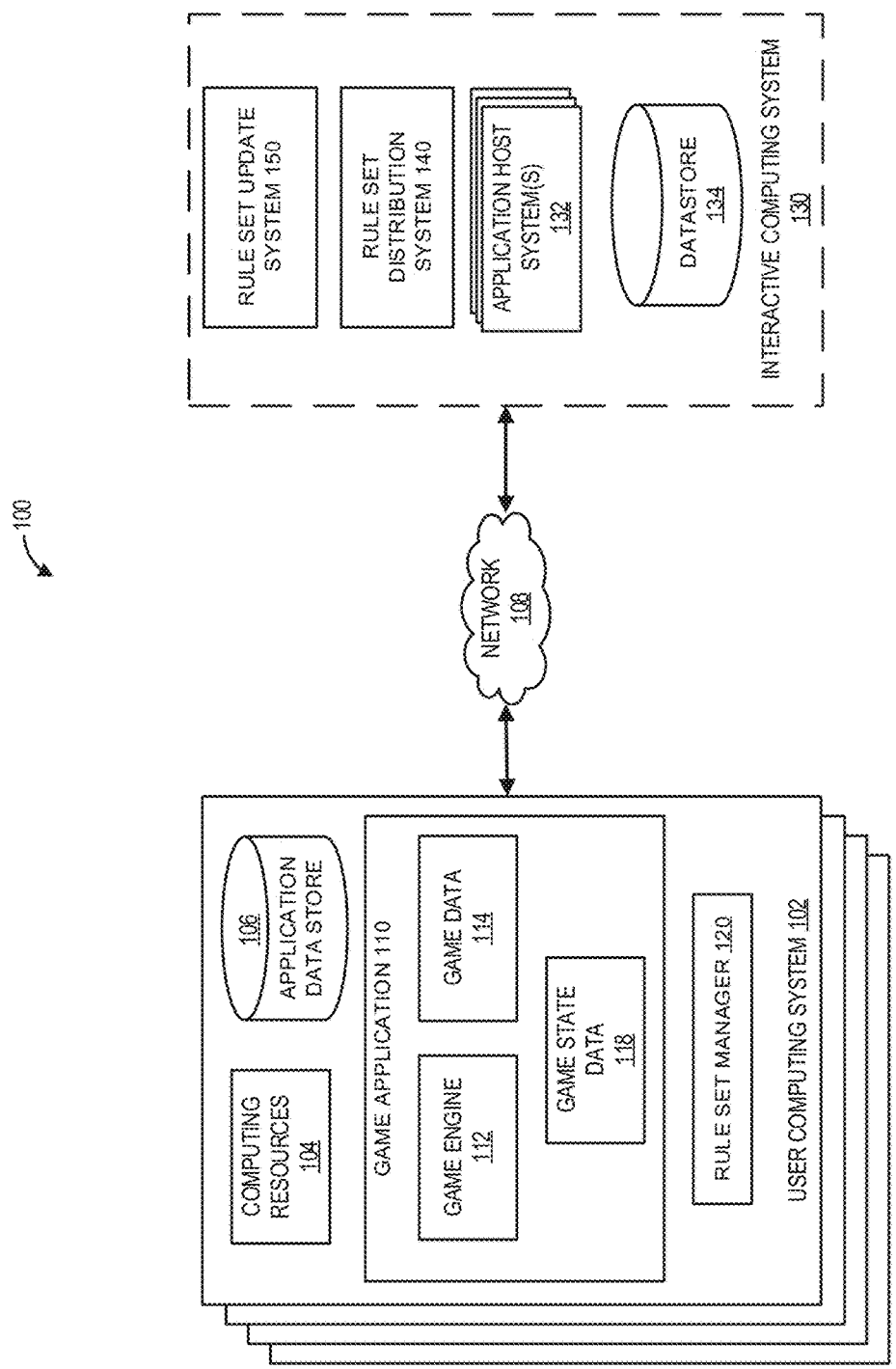
FIG. 1 illustrates an embodiment of a computing environment for triggering a particular runtime state of a video game, applying an exploratory rule set to the video game during the particular runtime state, or collecting game state data associated with the particular runtime state of the video game.

Using simulators to generate simulated environments can require considerable resources and time. As such, it is desirable to have a platform for developing the rule sets using fewer or no simulated environments from simulators, which can reduce the required computational resources, at least from the standpoint of the video game developer.

Solutions to these or other problems can include taking advantage of at least some of the computational resources of the players' computing systems and/or video game consoles while the players are playing the video game. For example, in general, many players—sometimes tens or hundreds or thousands—are playing the video game on their respective computing devices or video game consoles. System and methods described herein can make use of the players' gameplay develop the set of rules. In other words, the system is able to exploit the player's gameplay like that of a simulated environment, but without requiring much, if any, of the system's own computational resources.

System and methods for utilizing a computing system and/or video game console to monitor the player's video game, detect when a particular gameplay situation occurs during the player's video game experience, and collect game state data corresponding to how the player reacts to the particular gameplay situation or an effect of the reaction. In some cases, the player's computing system and/or video game console can receive an exploratory rule set to apply during the particular gameplay situation. In some cases, the player's computing system and/or video game console can trigger the particular gameplay situation. A system can receive the game state data from many computing systems and/or video game consoles and train a rule set based on the game state data. Advantageously, the system can save computational resources by utilizing the players' video game experience to train the rule set.

As an example, a player computing system and/or console can be used to monitor the player's video game, detect when a particular gameplay situation occurs during the player's video game experience, and record game state data corresponding to how the player reacts to the particular gameplay situation and an effect of the reaction (sometimes referred to as the reward). A system can communicate with the player console, as well as other player consoles, to receive the game state data, which it can utilize to further develop a rule set that defines how non-player characters act in the particular gameplay situation. Advantageously, the system saves computational resources by utilizing the players' natural video game experience as a simulation to obtain game state data, which it can utilize to develop the rule set.

As another example, a player computing system and/or console can receive an exploratory rule set that defines how non-player character act in a particular gameplay situation. The player computing system and/or console can be used to monitor the player's video game, detect when the particular gameplay situation occurs during the player's video game experience, apply the exploratory rule set during the particular gameplay situation, and record game state data corresponding to an effect of the application of the exploratory rule set. A system can communicate with the player computing systems and/or consoles to receive the game state data, which it can utilize to develop the exploratory rule set. Advantageously, the system saves computational resources by utilizing the players' video game experience as an opportunity to test the exploratory rule set and obtain game state data associated with application of the exploratory rule set, which it can utilize to develop the exploratory rule set.

As yet another example, a player computing system and/or console can be used to trigger the occurrence of a particular gameplay situation to occur during the player's video game experience and record game state data corresponding to the particular gameplay situation. A system can communicate with the player computing systems and/or consoles to receive the game state data, which it can utilize to develop a rule set that defines how non-player characters act in the particular gameplay situation. Advantageously, the system saves computational resources by utilizing the players' video game experience as a simulation to obtain game state data, which it can utilize to develop the rule set. Furthermore, by triggering the particular gameplay situation, the system can save time by not having to wait for the particular gameplay situation to arise naturally during the players' gameplay.

To simplify discussion, the present disclosure is primarily described with respect to a video game. However, the present disclosure is not limited as such may be applied to other types of applications. Further, the present disclosure is not limited with respect to the type of video game. The use of the term "video game" herein includes all types of games, including, but not limited to web-based games, console games, personal computer (PC) games, computer games, games for mobile devices (for example, smartphones, portable consoles, gaming machines, or wearable devices, such as virtual reality glasses, augmented reality glasses, or smart watches), or virtual reality games, as well as other types of games.

Overview of Video Game Environment

FIG. 1 illustrates an embodiment of a computing environment 100 for triggering a particular runtime state of a video game, applying an exploratory rule set to the video game during the particular runtime state, or collecting game state data associated with the particular runtime state of the video game. The environment 100 includes a network 108, a number of user computing systems 102, and an interactive computing system 130. To simplify discussion and not to limit the present disclosure, FIG. 1 illustrates only example user computing systems 102 and an interactive computing system 130, though multiple systems may be used.

The computing environment 100 may include a fewer or greater number of user computing systems 102. For example, the network computing environment 100 may have tens, hundreds, thousands, tens of thousands, hundreds of thousands, or millions of user computing systems 102, with each user computing system 102 enabling one or more users to interact with the video game 110. Further, one or more of the user computing systems 102 may be configured differently from computing environment 100. For simplicity, the user computing system 102 may be described in the singular or the plurality. However, it should be understood that any description of the user computing system 102 or user computing systems 102 may apply to one or more of the user computing systems 102 and may or may not apply to each of the user computing systems 102.

The user computing system 102 may communicate via a network 108 with the interactive computing system 130. Although only one network 108 is illustrated, multiple distinct or distributed networks 108 may exist. The network 108 can include any type of communication network. For example, the network 108 can include one or more of a wide area network (WAN), a local area network (LAN), a cellular network, an ad hoc network, a satellite network, a wired network, a wireless network, and so forth. In some embodiments, the network 108 can include the Internet.

User Computing Systems

FIG. 1 illustrates example user computing systems 102. A user computing system 102 may include hardware and software components for establishing communications over a communication network 108. For example, the user systems 102 may be equipped with networking equipment and network software applications (for example, a web browser) that facilitate communications via one or more networks 108 (for example, the Internet or an intranet). The user computing system 102 may have varied local computing resources 104 such as central processing units (CPU) and architectures, memory, mass storage, graphics processing units (GPU), communication network availability and bandwidth, and so forth. Further, the user computing system 102 may include any type of computing system. For example, the user computing system 102 may include any type of computing device(s), such as desktops, laptops, video game platforms, television set-top boxes, televisions (for example, Internet TVs), network-enabled kiosks, car-console devices computerized appliances, wearable devices (for example, smart watches and glasses with computing functionality), or wireless mobile devices (for example, smart phones, PDAs, tablets, or the like), to name a few. The specific hardware and software components of the user computing systems 102, are referred to generally as computing resources 104.

Game Application

The user computing system 102 can include a game application 110 installed thereon. The user computing system 102 can execute a game application 110 based on software code stored at least in part in the application data store 106. The game application 110 may also be referred to herein as a video game, a game, game code or a game program. A game application 110 should be understood to include software code that a computing device 102 can use to provide a game for a user to play. A game application 110 may include software code that informs a computing device 102 of processor instructions to execute, but may also include data used in the playing of the game, such as data relating to game simulation, rendering, animation, and other game data. In the illustrated embodiment, the game application 110 includes a game engine 112, game data 114, and game state data 118. When executed, the game application 110 is configured to generate a virtual environment for a user to interface with the game application 110.

In some embodiments, the user computing system 102 can execute machine readable instructions that are configured to execute the game application 110, such as a video game, stored on a data store on the user computing system (for example, application data store 106). The game application 110 may be stored or executed in a distributed environment using a client/server architecture. For example, the user computing system 102 may execute a portion of a game application 110 and the interactive computing system 130, or an application host system 132 of the interactive computing system 130 may execute another portion of the game application 110. For instance, the game application 110 may be a massively multiplayer online role-playing game (MMORPG) that includes a client portion executed by the user computing system 102 and a server portion executed by one or more application host systems 132. For the present discussion, the game application 110 can execute locally on the user computing system 102 or can execute as a distributed application that includes a portion that executes on the user computing system 102 and a portion that executes on at least one of the application host systems 132.

Game Engine

During operation, the game engine 112 executes the game logic, controls execution of the simulation of gameplay, and controls rendering within the game application 110. In some cases, the game engine 112 controls characters, the environment, execution of the gameplay, how the game progresses, or other aspects of gameplay based on one or more stored rule sets. For example, the game engine 112 can monitor gameplay and detect or determine a current runtime state of the game application 110. Based at least in part on the current runtime state of the game application, the game engine 112 applies a rule set to control the characters or the environment.

In some embodiments, the game engine 112 can include a simulation engine and a presentation engine. The simulation engine executes the game logic and controls execution of the gameplay simulation. The presentation engine controls execution of presentation of the gameplay and rendering of frames. In some embodiments, the game engine 112 can execute the functionality of the simulation engine and the presentation engine using different engines and/or processes within the game application.

The simulation engine can control execution of individual virtual components, virtual effects or virtual objects within the game application 110. The simulation engine can manage and determine character movement, character states, collision detection, derive desired motions for characters based on collisions, or the like. The simulation engine receives user inputs and determines character events, such as actions, collisions, runs, throws, attacks and other events appropriate for the game. The character events can be controlled by character movement streams that determine the appropriate motions the characters should make in response to events. The simulation engine can interface with a physics engine that can determine new poses for the characters. The physics engine can have as its inputs, the skeleton models of various characters, environmental settings, character states such as current poses (for example, positions of body parts expressed as positions, joint angles or other specifications), and velocities (linear or angular) of body parts and motions provided by a character movement module, which can be in the form of a set of force/torque vectors for some or all body parts. From this information, the physics engine generates new poses for the characters using rules of physics and those new poses can be used to update character states. The game device provides for user input to control aspects of the game according to rule sets.

The simulation engine can output graphical state data (e.g., game state data 114) that is used by presentation engine to generate and render frames within the game application 110. In some embodiments, each virtual object can be configured as a state stream process that is handled by the simulation engine. Each state stream process can generate graphical state data for the presentation engine. For example, the state stream processes can include emitters, lights, models, occluders, terrain, visual environments, and other virtual objects with the game application 110 that affect the state of the game.

The presentation engine can use the graphical state data to generate and render frames for output to a display within the game application 110. The presentation engine can to combine the virtual objects, such as virtual characters, animate objects, inanimate objects, background objects, lighting, reflection, and the like, in order to generate a full scene and a new frame for display. The presentation engine takes into account the surfaces, colors textures, and other parameters of the virtual objects. The presentation engine can then combine the virtual objects (for example, lighting within the virtual environment and virtual character images with inanimate and background objects) to generate and render a frame.

Game Data

The game data 114 can include rule sets, prerecorded motion capture poses/paths, environmental settings, environmental objects, constraints, skeleton models, route information, or other game application information.

Rule sets can be applied by the game engine 112 to control characters, the environment, execution of the gameplay, how the game progresses, or other aspects of gameplay. The rule sets can define the specific way in which players (for example, player characters or non-player characters) or the environment behaves or interacts within the video game. For example, the rules sets can correspond to difficulty levels (for example, easy, normal, hard, novice, expert) of a video game. As another example, the rule sets can control a number of resources available to a player, a number of challenges a player must face to progress through the video game, rules for scoring, possible inputs, actions, events, movement in response to inputs, or the like. Further still, for instance in sports-related video games, the rules set can control a degree of skill or ability of a particular virtual player, team, or coach, or can dictate how virtual entities react to particular in-game situations, such as a breakaway, a 3-on-1 attack, a 3-on-1 defense, or the like. In some cases, rule sets can function as a virtual entities' brain or artificial intelligence.

In some cases, the rule sets can be described using the concepts of agents, actions, runtime states, or environments. For example, an agent can be a virtual character in the video game, such as a player character (e.g., controlled by a user) or a non-player character (e.g., controlled by the game application), and an action can be a move from a set of all possible moves the agent can make. For example, a hockey player (the agent) can pass (action A) or shoot (action B) the puck, among other possible actions. A runtime state can be described as a concrete and immediate situation in which the agent finds itself. For example, the runtime state can be a specific place and moment, such as an instantaneous configuration that puts the agent in relation to other significant things like tools, obstacles, enemies or prizes. A virtual environment can be described as the virtual world through which the agent moves. In general, a rule or rule set can define an agent's way of behaving (for example, the agent's actions) at a given time, runtime state, and environment.

At least a portion of the game data 114 can be stored in the application data store 106. In some embodiments, a portion of the game data 114 may be received or stored remotely, such as in the data store 134. Game data may be received during runtime of the game application 110. For example, in some cases, one or more rule sets (for example, exploratory rules sets) can be received, stored, or applied during runtime of the game application 110.

Game State Data

During runtime of the game application 110, the game application 110 can collect or store game state data 118, which can include a game state, character states, environment states, scene object storage, route information, or information associated with a runtime state of the game application 110. For example, the game state data 118 can identify the state of the game application 110 at a specific point in time, such as a character position, character orientation, character action, game level attributes, and other information contributing to a state of the game application 110. The game state data can include simulation game state data and graphical game state data. The simulation game state data can include game state data that is used by the game engine 112 to execute the simulation of the game application 110. The graphical game state data can include game state data that is generated based on the simulation state data and is used to generate and render frames for output on a display.

In some cases, the game state data can include feedback related to application of a particular rule set during a particular runtime state. In some cases, this feedback effectively evaluates the application of that particular rule set during that particular runtime state. For example, the feedback can include an indication of a success or a failure, or somewhere in-between. For example, in a video game, when application of a rule set causes a player to juke a defender or score a goal, the game state data can include positive feedback to indicate success. As another example, when application of a rule set causes a player to commit a turnover, the game state data can include negative feedback to indicate failure. From any given runtime state, the game engine 112 can apply a rule set and game state data can be collected. Feedback can be immediate feedback (for example, causing an immediate reward) or delayed feedback (for example, causing a delayed reward).

In general, a policy defines an agent's way of behaving at a given time. Put another way, a policy is a strategy that the agent employs to determine the next action based on the current state. A policy can be built or derived over time, for example to maximize rewards. For example, the agent can be "trained" by trying a large number of actions in a given environment, and optimizing the policy for a defined reward function.

Rule Set Manager

The rule set manager 120 can facilitate application of the game rules by the game engine 112. For example, rule set manager 120 can interface with the game engine 112 to cause the game engine 112 to apply the appropriate rule or rule set. For example, in some cases, the game data can include a plurality of rule sets, and a particular rule set can be associated with a particular runtime state of the game application. The rule set manager 120 can monitor gameplay of the game application 110 to determine the current or anticipated runtime state of the game application 110. Based on the current or anticipated runtime state of the game application, the rule set manager 120 can provide the game engine 112 with the appropriate rule set to apply.

In some cases, more than one rule set may be applicable to a particular runtime state of the game application 110. For example, the game data can include one or more default rule sets and one or more exploratory rules set. As described herein, exploratory rule sets (sometimes referred to as beta rule sets) can be rule sets that developers of the game application would like to further develop, while default rule sets can be rule sets that execute on the game application by default (e.g., rule sets governing easy, medium, and hard modes of play). In some cases, both a default rule set and an exploratory rule set apply to particular runtime state of the game application 110. The rule set manager 120 can facilitate application of the game rules by the game engine 112 by instructing the game engine 112 as to which rules to apply.

In some implementations, the rule set manager 120 is an add-in (sometimes referred to as an add-on, extension, or plug-in). For example, the rule set manager 120 can be available for download by the user computing systems 102 and can be installed locally in volatile or non-volatile memory on the user computing systems 102. In some embodiments, a rule set manager 120 may be executed on a remote server. For example, the rule set manager 120 may be executed on the interactive computing system 130. In some instances, the rule set manager 120 that is available to a particular user may be based on the software that has been previously installed by the user on the user computing system 102. For example, some rule set managers 120 may require a license in order to utilize the tools.

Virtual Environment

As used herein, a virtual environment may include a simulated environment (for example, a virtual space) instanced on a user computing system 102, a server (for example, the interactive computing system 130) that is accessible by a client (for example, user computing system 102) located remotely from the server, to format a view of the virtual environment for display to a user of the client. The simulated environment may have a topography, express real-time interaction by the user, or include one or more objects positioned within the topography that are capable of locomotion within the topography. In some implementations, the topography may be a two-dimensional topography. In other instances, the topography may be a three-dimensional topography. In some implementations, the topography may be a single node. The topography may include dimensions of the virtual environment, or surface features of a surface or objects that are "native" to the virtual environment. In some implementations, the topography may describe a surface (for example, a ground surface) that runs through at least a substantial portion of the virtual environment. In some implementations, the topography may describe a volume with one or more bodies positioned therein (for example, a simulation of gravity-deprived space with one or more celestial bodies positioned therein). A virtual environment may include a virtual world, but this is not necessarily the case. For example, a virtual environment may include a game space that does not include one or more of the aspects generally associated with a virtual world (for example, gravity, a landscape, etc.). By way of illustration, the well-known game Tetris may be formed as a two-dimensional topography in which bodies (for example, the falling tetrominoes) move in accordance with predetermined parameters (for example, falling at a predetermined speed, and shifting horizontally or rotating based on user interaction).

The game instance of the video game 110 may include a simulated virtual environment, for example, a virtual environment that is accessible by users via clients (for example, user computing systems 102) that present the views of the virtual environment to a user. The virtual environment may have a topography, express ongoing real-time interaction by one or more users or include one or more objects positioned within the topography that are capable of locomotion within the topography. In some instances, the topography may include a two-dimensional topography. In other instances, the topography may include a three-dimensional topography. The topography may include dimensions of the space or surface features of a surface or objects that are "native" to the space. In some instances, the topography may describe a surface (for example, a ground surface) that runs through at least a substantial portion of the space. In some instances, the topography may describe a volume with one or more bodies positioned therein (for example, a simulation of gravity-deprived space with one or more celestial bodies positioned therein). The instance executed by the computer components may be synchronous, asynchronous, or semi-synchronous.

It should be understood the above description of the manner in which state of the virtual environment associated with the video game is not intended to be limiting. The game application 110 may be configured to express the virtual environment in a more limited, or richer, manner. For example, views determined for the video game representing the game state of the instance of the video game may be selected from a limited set of graphics depicting an occurrence in a given place within the video game. The views may include additional content (for example, text, audio, pre-stored video content, or other content) that describes particulars of the current state of the place, beyond the relatively generic graphics. For example, a view may include a generic battle graphic with a textual description of the opponents to be confronted. Other expressions of individual places within the video game are contemplated.

The game engine 112 generates game state data 118 that may be used locally within the game application 110 and may be transmitted to the interactive computing system 130 over network 108. The execution of the instance of the game application 110 may include determining a game state associated with the game application 110. The game state data 118 may facilitate presentation of views of the video game to the users on the user computing systems 102. The game state data 118 may include information defining the virtual environment in which the video game is played. The execution of the game engine is described in further detail herein.

The execution of the game instance may enable interaction by the users with the game application 110 or other users through the interactive computing system 130. The game application 110 may be configured to perform operations in the game instance in response to commands received over network 108 from user computing systems 102. In some embodiments, users may interact with elements in the video game or with each other through the video game.

Users may participate in the video game through client game applications 110 implemented on user computing systems 102 associated with the users. Within the game instance of the video game executed by the game engine 112, the users may participate by controlling one or more of an element in the virtual environment associated with the video game. The user-controlled elements may include avatars, user characters, virtual environment units (for example, troops), objects (for example, weapons, horses, vehicle and so on), simulated physical phenomena (for example, wind, rain, earthquakes, or other phenomena), or other user-controlled elements.

The user-controlled avatars may represent the users in the virtual environment. The user characters may include heroes, knights, commanders, leaders, generals or any other virtual environment entities that may possess strength, skills, abilities, magic powers, knowledge, or any other individualized attributes. The virtual environment units controlled by the user may include troops or any other game entities that may be trained, recruited, captured, or otherwise acquired by the users in groups or en-mass. The objects controlled by the users may include weapons, vehicles, projectiles, magic items, wardrobes, boots, armor, knapsacks, medicine, healing potion, or any other virtual items that may be employed by the users for interaction within the video game.

The user-controlled element(s) may move through and interact with the virtual environment (for example, user-virtual environment units in the virtual environment, non-user characters in the virtual environment, other objects in the virtual environment). The user controlled elements controlled by or associated with a given user may be created or customized by the given user. The user may have an "inventory" of virtual goods or currency that the user can use (for example, by manipulation of a user character or other user controlled element, or other items) within the virtual environment.

Controls of virtual elements in the video game may be exercised through commands input by a given user through user computing systems 102. The given user may interact with other users through communications exchanged within the virtual environment. Such communications may include one or more of textual chat, instant messages, private messages, voice communications, or other communications. Communications may be received and entered by the users via their respective user computing systems 102. Communications may be routed to and from the appropriate users through server(s) (for example, through application host system 132).

Execution or performance of the user action by the game engine 112 may produce changes to the game state, which may reflect progresses or results of the user actions. In some examples, state changes caused by the execution of the user actions may be recorded in the application data store 106 or data store 134 to facilitate persistency throughout the instance of the video game. In some examples, execution of the user actions may not produce persistent changes to the game state (for example, a user character jumping forward and backward successively may not produce any perceivable game state changes to other users).

A given user may input commands with specific parameters to undertake specific deeds, actions, functions, spheres of actions or any other types of interactions within the virtual environment. For example, the given user may input commands to construct, upgrade or demolish virtual buildings; harvest or gather virtual resources; heal virtual user-controlled elements, non-player entities or elements controlled by other users; train, march, transport, reinforce, reassign, recruit, or arrange troops; attack, manage, create, demolish or defend cities, realms, kingdoms, or any other virtual environment locations controlled by or associated with the users; craft or transport virtual items; interact with, compete against or along with non-player entities or virtual environment elements controlled by other users in combats; research technologies or skills; mine or prospect for virtual resources; complete missions, quests, or campaigns; exercise magic power or cast spells; or perform any other specific deeds, actions, functions, or sphere of actions within the virtual environment. In some examples, the given user may input commands to compete against elements in an environment within the virtual environment—for example, Player vs. Environment (PvE) activities. In some examples, the given user may input commands to compete against each other within the virtual environment—for example, Player vs. Player (PvP) activities.

The instance of the video game may include virtual entities automatically controlled in the instance of the video game. Such virtual entities may or may not be associated with any user. As such, the automatically controlled virtual entities may be generated or developed by artificial intelligence configured with the game application 110 or server(s) interactive computing system 130 by a provider, administrator, moderator, or any other entities related to the video game. These automatically controlled entities may evolve within the video game free from user controls and may interact with the entities controlled by or associated with the users, other automatically controlled virtual environment entities, as well as the topography of the virtual environment. Certain manifested traits may be associated with the automatically controlled entities in accordance with the artificial intelligence configured with server(s) (for example, application host system 132). As used herein, such automatically controlled virtual environment entities in the instance of the video game are referred to as "non-player entities."

In an online game, the instance of the video game may be persistent. That is, the video game may continue on whether or not individual users are currently logged in or participating in the video game. A user that logs out of the video game and then logs back in some time later may find the virtual environment or the video game has been changed through the interactions of other users with the video game during the time the user was logged out. These changes may include changes to the simulated physical space, changes in the user's inventory, changes in other users' inventories, changes experienced by non-user characters, or other changes.

Interactive Computing System

The interactive computing system 130 may include an application host system 132, a data store 133, a rule set generation and update system 150, and a rule set distribution system 140. The interactive computing system 130 may include one or more computing systems configured to execute a portion of the game application 110. The interactive computing system 130 may enable multiple users or computing systems to access a portion of the game application 110 executed or hosted by the interactive computing system 130. The interactive computing system 130 can have one or more game servers that are configured to host online video games. For example, the interactive computing system 130 may have one or more game servers that are configured to host an instanced (for example, a first person shooter multiplayer match) or a persistent virtual environment (for example, a multiplayer online roll playing game). The virtual environment may enable one or more users to interact with the environment and with each other in a synchronous or asynchronous manner. In some cases, multiple instances of the persistent virtual environment may be created or hosted by one or more game servers. A set of users may be assigned to or may access one instance of the virtual environment while another set of users may be assigned to or may access another instance of the virtual environment. In some embodiments, the interactive computing system 130 may execute a hosting system for executing various aspects of a game environment. For example, in one embodiment, the game application 110 may be a competitive game, such as a first person shooter or sports game, and the interactive computing system 130 can provide a dedicated hosting service (such as, through the game servers) for hosting multiplayer game instances or facilitate the creation of game instances hosted by user computing devices.

Rule Set Distribution System

The rule set distribution system 140 can be configured to communicate with the user computing systems 102, for example via the network 108, such that a user computing system 102 can obtain rule sets, or updates thereto. For example, the rule set distribution system 140 can transmit the rule sets to the user computing system 102 via data packets. As another example, the user computing system 102 can download the rule sets from the rule set distribution system 140.

In some cases, the rule set distribution system 140 can additionally or alternatively communicate one or more data collection rules to the user computing systems 102, for example via the network 108. For example, the rule set distribution system 140 can transmit the data collection rules to the user computing system 102 via data packets. As another example, the user computing system 102 can download the data collection rules from the rule set distribution system 140.

A data collection rule can inform the user computing systems 102 of which data to collect, store, or supply to the interactive computing system 130. For example, with respect to application of an exploratory rule set, a data collection rule can indicate when to collect data or what type of data to collect. As an example, a data collection rule can indicate one or more specific points during runtime of the game application 110 to collect game state data. The specific points in the game application 110 can correspond to one or more runtime states of the game application 100, such as a game state, a character state, an environment state, or the like.

As another example, a data collection rule can dictate what type of game state data to collect, store, or communicate. For example, in some cases, the data collection rule can indicate to a user computing system 102 to collect, store, or communicate game state data that includes feedback related to application of a particular rule set during a particular runtime state. In some cases, this feedback effectively evaluates the application of that particular rule set during that particular runtime state. For example, the feedback can include an indication of a success or a failure, or somewhere in-between. For example, in a video game, when application of a rule set causes a player to juke a defender or score a goal, the game state data can include positive feedback to indicate success. As another example, when application of a rule set causes a player to commit a turnover, the game state data can include negative feedback to indicate failure.

In some cases, the rule set distribution system 140 provides the rule sets at predetermined intervals, such as every day, week, or month. In some cases, the rule set distribution system 140 provides the rule sets when the rules sets, or updates, thereto become available from the rule set update system 150, or for example when a developer desires to further develop a rule set (sometimes referred to as an exploratory rule set).

In some implementations, the rule set distribution system 140 does not create, develop, or update the rule sets. For example, the rule set distribution system 140 can receive or obtain the rule sets from a rule set update system 150, as discussed herein. In some implementations, the rule set distribution system 140 can be incorporated and/or integrated into the interactive computing system 130 or the rule set update system 150.

Rule Set Update System

The rule set update system 150 can be configured to communicate with the user computing systems 102 such that the rule set update system 150 can obtain game state data from the user computing systems 102. For example, the user computing systems 102 can transmit the game state data via data packets. In some cases, the user computing systems 102 transmits the game state data during runtime of the game application 110, such as brief stretches of play so as to not interfere with the user's overall game experience. In some cases, the user computing systems 102 transmits the game state data outside of runtime of the game application 110.

In some implementations, the rule set update system 150 creates or develops the rule sets, or updates thereto. For example, the rule set update system 150 can utilize artificial intelligence or machine learning principals, such as reinforcement learning, to "train" the rule sets. In general, the overall training of a particular rule set can be based on an aggregation, or a subset thereof, of the "micro experiments" that are the user's gameplay sessions. For example, by utilizing a collective average of information relating to actions taken by a large number of human players and the results of those actions, the rule sets can be trained towards behavior leading to greater rewards (for example, game success).

As an example, the rule set distribution system 140 can transmit an exploratory rule set to a plurality of user computing systems 102, and each of the plurality of user computing systems 102 can apply an exploratory rule set during runtime of the game application 110 and obtain game state data corresponding to the application of the exploratory rule set. As described herein, the game state data can include information relating to actions taken and the results of those actions (for example, rewards and punishment as signals for positive and negative behavior). The user computing systems 102 can communicate the game state data to the rule set update system 150, and the rule set update system 150 can train (for example, update or revise) the exploratory rule set based at least in part on the game state data. For example, in some cases, the rule set distribution system 140 can update the exploratory rule set to maximize the total cumulative reward of the rule set.

In some cases, the rule set update system 150 may utilize one or more variables or parameters that can be combined using a mathematical algorithm to generate, develop, or update one or more rule sets based on game state data or historical data. The historical data can include previously acquired game state data. In some cases, historical data can include data received from one or more data sources, such as, for example, an application host system (not shown) or one or more user computing systems 102. Further, the historical data can include data from different data sources, different data types, and any previously generated or updated rule sets. In some embodiments, the historical data may include a large number of data points, such as millions of data points, which may be aggregated into one or more data sets. In some cases, the historical data may be accessed from the data store 134. In some embodiments, the historical data is limited to historical information associated with a particular game application 110, but in other embodiments, the historical data may include information from one or more other video games. In some cases, the other video games are similar (for example, the same genre, the same theme, the same or similar types of objectives, and the like). In other cases, the video games that provide the historical data are not limited in type or similarity. Further, in some embodiments, one or more subsets of the historical data may be limited by a date restriction, such as for example, limited to include only data from the last 6 months, data that is between 3-6 months old, or data less than a year old.

Using reinforcement learning in this way to update the exploratory rule set can typically require a high volume of trial and error episodes. As described herein, traditionally, simulators have been utilized to simulate these interactions with the environment. However, the rule set update system 150 advantageously utilizes gameplay from a large number of user computing systems 102, such as hundreds, thousands, hundreds of thousands, or more user computing systems 102, to act as simulations of the interactions with the environment. As such, in some cases, considerable time and resources are conserved by avoiding the computing requirements of generating a high volume of simulations. Typically, the rule sets are trained based on game state data from a large number of user computing systems 102, such as hundreds, thousands, hundreds of thousands, or more user computing systems 102. However, the present disclosure is not limited as such, and the number of user computing systems 102 may include any number of user computing systems 102.

Collecting Game State Data Related to a Video Game

Figure 2:
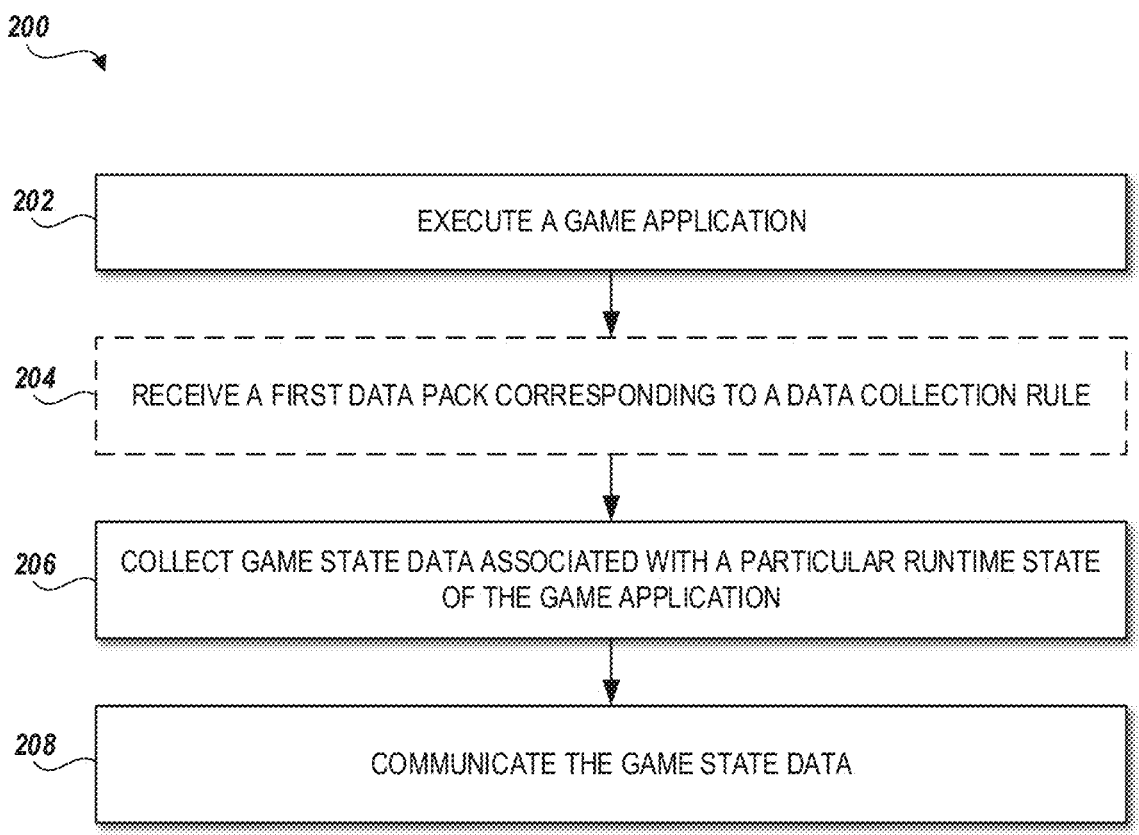
FIG. 2 presents a flowchart of an embodiment of a process for collecting game state data associated with a particular runtime state of a video game.

FIG. 2 presents a flowchart of an embodiment of a process 200 for collecting game state data associated with a particular runtime state of a video game. In some cases, the process 200 serves as a training process for developing game data of the video game, such as developing rules of the video game. The process 200, in whole or in part, can be implemented by, for example, an interactive computing system 130 or a user computing system 102, among others. Although any number of systems, in whole or in part, can implement the process 200, to simplify discussion, the process 200 will be described with respect to particular systems. Further, it should be understood that the process 200 may be updated or performed repeatedly over time. For example, the process 200 may be repeated once per day, week, month, or the like, with the addition or release of a new video game, with the generation of or access to an additional exploratory rule set, or with the addition of a threshold number of new users available for analysis or who are playing a game application 110. However, the process 200 may be performed more or less frequently.

At block 202, the user computing system 102 executes a game application 110 to provide a game for a user to play. As described herein, the game application 110 may be stored and/or executed locally on the user computing system 102 and/or in a distributed environment. During runtime of the game application 110, the user computing system 102 executes the game logic, controls execution of the simulation of gameplay, and controls rendering within the game application 110. Furthermore, during runtime of the game application 110, the user computing system 102 applies rule sets, as described herein.

At block 204, the user computing system 102 receives, over the network 108, one or more data packets corresponding to a data collection rule. As described herein, a data collection rule can indicate when to collect, store, or communicate game state data, or what type of game state data to collect, store, or communicate. In some cases, the user computing system 102 does not receive a data collection rule. For example, the user computing system 102 can be pre-configured to collect, store, or communicate the appropriate game state data.

At block 206, the user computing system 102 collects game state data associated with a first runtime state of the game application 110. In some cases, the collection of data can be based at least in part on the data collection rule. As described herein, the game state data can include runtime state data, as well as feedback related to application of a particular rule set during the first runtime state. As an example, during gameplay, the user computing system 102 can apply a rule set during the first runtime state of the game application 110. For instance, if the application of the rule set causes the player to commit a turnover, the game state data can include feedback relating to this negative result.

At block 208, the user computing system 102 communicates the game state data to the interactive computing system 130, for example over the network 108. As described herein, the interactive computing system 130 can receive the game state data, as well as game state data from other user computing systems 102, and can update or modify a rule set based at least in part on the game state data.

It will be understood that the various blocks described herein can be implemented in a variety of orders, and that the user computing system 102 can implement one or more of the blocks concurrently or change the order, as desired. For example, the user computing system 102 can concurrently receive the data packets and collect game state data. Similarly, the user computing system 102 can concurrently collect game state data and communicate the game state data.

Furthermore, it will be understood that fewer, more, or different blocks can be used as part of the process 200. For example, similar to the process 300 of FIG. 3, the process 200 can include blocks for receiving a data packet corresponding to an exploratory rule set, monitoring a runtime state of the game application, or applying the exploratory rule set responsive to a determination that the runtime state of the game application is the first runtime state. As another example, similar to the process 400 of FIG. 4, the process 200 can include blocks for altering gameplay of the game application to trigger the first runtime state. In some embodiments, the blocks of process 200 can each occur during runtime of the game application. In some embodiments, one or more of the blocks of process 200 can each occur while the game application is not running.

It will be understood that the various steps described herein with respect to FIG. 2 can be implemented in a variety of orders, and that one or more of the steps of FIG. 2 can be implemented concurrently and/or the order changed, as desired. Furthermore, it will be understood that fewer, more, or different steps can be used as part of the routine of FIG. 2. For example, in some cases, certain steps can be omitted, such as, but not limited to, dashed block 204.

Applying an Exploratory Rule Set to a Video Game

Figure 3:
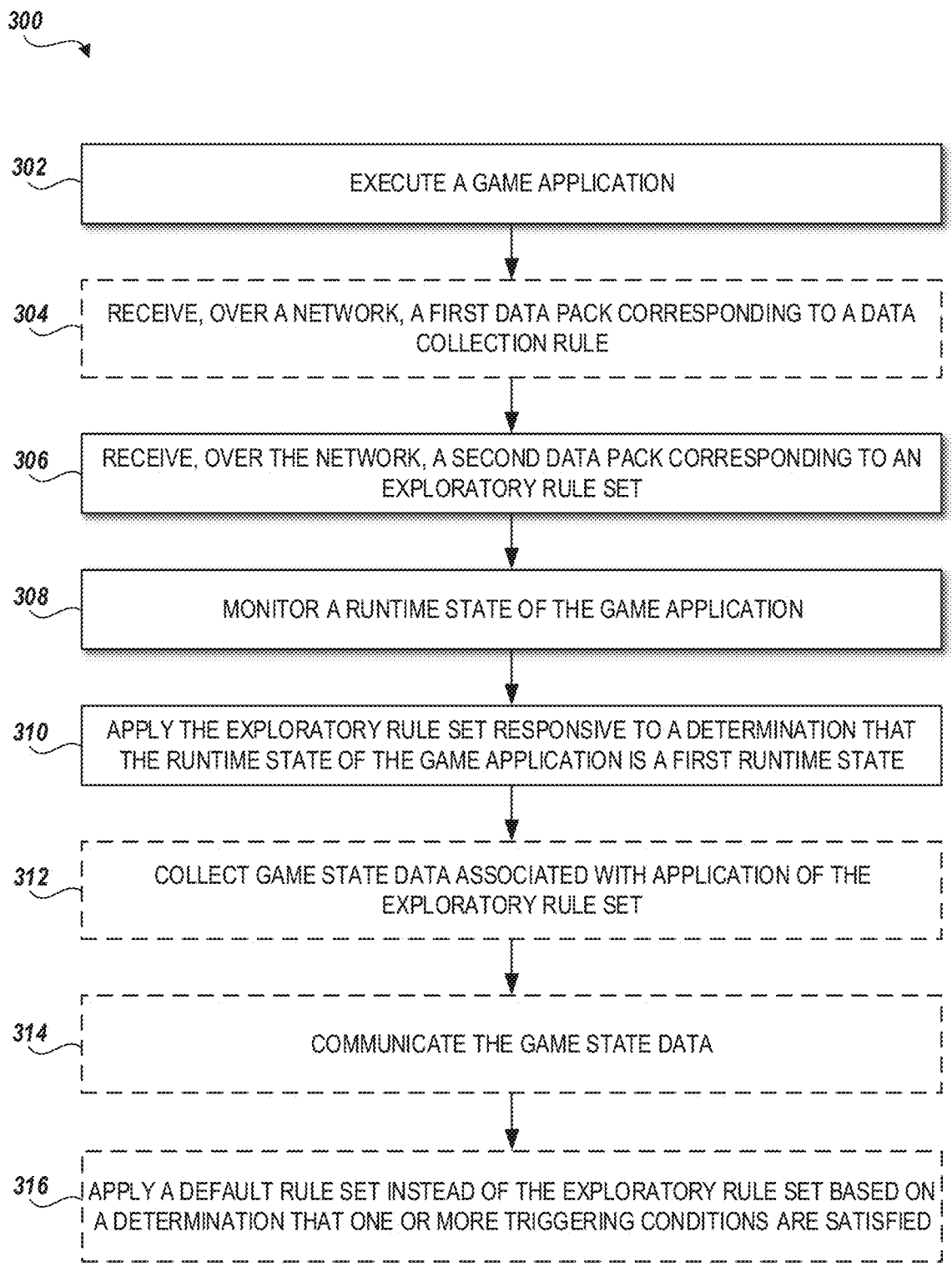
FIG. 3 presents a flowchart of an embodiment of a process for applying an exploratory rule set during a particular runtime state of a video game.

FIG. 3 presents a flowchart of an embodiment of a process 300 for applying an exploratory rule set during a particular runtime state of a video game. In some cases, the process 300 serves as a training process for developing game data of the video game, such as developing rules of the video game. The process 300, in whole or in part, can be implemented by, for example, an interactive computing system 130 or a user computing system 102, among others. Although any number of systems, in whole or in part, can implement the process 300, to simplify discussion, the process 300 will be described with respect to particular systems. Further, it should be understood that the process 300 may be updated or performed repeatedly over time. For example, the process 300 may be repeated once per day, week, month, or the like, with the addition or release of a new video game, with the generation of or access to an additional exploratory rule set, or with the addition of a threshold number of new users available for analysis or who are playing a game application 110. However, the process 300 may be performed more or less frequently.

At blocks 302 and 304, similar to blocks 202 and 204 of FIG. 2, a user computing system 102 executes a game application 110 and receives at least a first data packet corresponding to a data collection rule.

At block 306, the user computing system 102 receives, over the network 108, at least a second data packet corresponding to an exploratory rule set. As described herein, the exploratory rule set can correspond to a first runtime state, such that the exploratory rule set is applied when the game application 110 is in the first runtime state. The first runtime state can refer to a triggering game state. The triggering game state can define specific conditions within the game state where the exploratory rule set can be applied. For example, in a hockey game, the triggering game state may be satisfied when there is a 3-on-1 situation.

At block 308, the user computing system 102 monitors, tracks, or stores the runtime state of the game application. For example, during runtime of the game application 110, the game application 110 can monitor, track, or store game state data 118, which can include, but is not limited to, a game state, character states, environment states, scene object storage, route information, or information associated with a runtime state of the game application 110. For example, the game state data 118 can identify the runtime state of the game application 110 at a specific point in time, such as a character position, character orientation, character action, game level attributes, and other information contributing to a state of the game application 110

At block 310, the user computing system 102 applies the exploratory rule set to the game application 110 based at least in part on a determination that the runtime state of the game application satisfies the conditions of the first runtime state. In some cases, the exploratory rule set is applied instead of, or in place of, another rule set. For example, the exploratory rule set may be the default rule set that is being used within the game application. As another example, the exploratory rule set may be applied in place of the default rule set that is being used within the game application. In some cases, at block 310, the user computing system 102 swaps the default rule set for the exploratory rule set.

At blocks 312 and 314, similar to blocks 206 and 208 of FIG. 2, the user computing system 102 collects game state data and communicates the game state data.

At block 316, the user computing system 102 applies the first rule set to the game application 110 based at least in part on a determination that the runtime state of the game application 110 is the first runtime state. For example, the user computing system 102 can determine that one or more triggering conditions are met, which indicate, for example to the rule set manager, that the exploratory rule set should no longer be applied. In some cases, a triggering condition can be satisfied if the runtime state of the game application 110 changes, such as to a runtime state other than the first runtime state. In some cases, a triggering condition can be satisfied is the exploratory rule set is applied for a predetermined period of time. In some cases, based at least in part on a determination that the runtime state of the game application 110 is the first runtime state and a determination that the triggering condition(s) are satisfied, or were previously satisfied since the application of the exploratory rule, the user computing system 102 applies a first rule set instead of, or in place of, the exploratory rule set. For example, the first rule set may be the default rule set that is being used within the game application. In some cases, at block 316, the user computing system 102 swaps the exploratory rule set for the default rule set.

It will be understood that the various blocks of process 300 can be implemented in a variety of orders, and that the user computing system 102 can implement one or more of the blocks concurrently or change the order, as desired. For example, the user computing system 102 can concurrently receive the first data packet, receive the second data packet, or collect game state data. Similarly, the user computing system 102 can concurrently collect game state data and communicate the game state data.

Furthermore, it will be understood that fewer, more, or different blocks can be used as part of the process 300. For example, similar to the process 400 of FIG. 4, the process 300 can include blocks for altering gameplay of the game application to trigger the first runtime state. In some embodiments, the blocks of process 300 can each occur during runtime of the game application. In some embodiments, one or more of the blocks of process 200 can each occur while the game application is not running.

It will be understood that the various steps described herein with respect to FIG. 3 can be implemented in a variety of orders, and that one or more of the steps of FIG. 3 can be implemented concurrently and/or the order changed, as desired. Furthermore, it will be understood that fewer, more, or different steps can be used as part of the routine of FIG. 3. For example, in some cases, certain steps can be omitted, such as, but not limited to, dashed blocks 304, 312, 314, or 316.

Triggering a Runtime State of a Video Game

Figure 4:
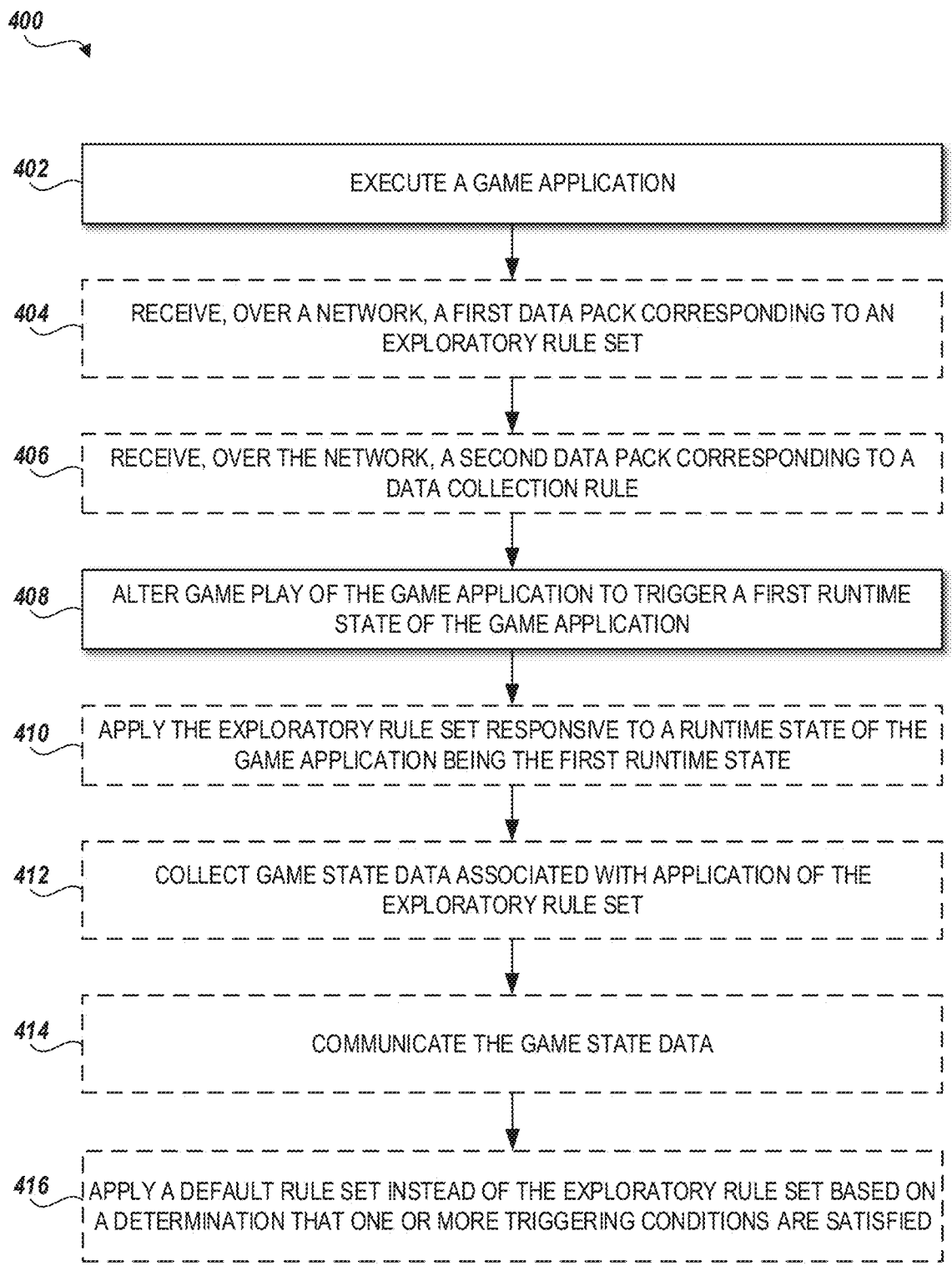
FIG. 4 presents a flowchart of an embodiment of a process for triggering a particular runtime state of a video game.

FIG. 4 presents a flowchart of an embodiment of a process 400 for triggering a particular runtime state of a video game. In some cases, the process 400 serves as a training process for developing game data of the video game, such as developing rules of the video game. The process 400, in whole or in part, can be implemented by, for example, an interactive computing system 130 or a user computing system 102, among others. Although any number of systems, in whole or in part, can implement the process 400, to simplify discussion, the process 400 will be described with respect to particular systems. Further, it should be understood that the process 400 may be updated or performed repeatedly over time. For example, the process 400 may be repeated once per day, week, month, or the like, with the addition or release of a new video game, with the generation of or access to an additional exploratory rule set, or with the addition of a threshold number of new users available for analysis or who are playing a game application 110. However, the process 400 may be performed more or less frequently.

At block 402, 404, and 406, similar to blocks 302, 304, and 306 of FIG. 3, a user computing system 102 executes a game application 110, receives a first data packet corresponding to a data collection rule, and receives a second data packet corresponding to an exploratory rule set.

At block 408, a user computing system 102 alters gameplay of the game application 110 to trigger a first runtime state of the game application 110. In other words, rather than waiting for the first runtime state of the game application 110 to occur naturally during gameplay, the user computing system 102 changes the gameplay so that the runtime state of the game application 110 satisfies the conditions of the first runtime state. By altering gameplay of the game application so that it satisfies the first runtime state, rather than simply waiting for the first runtime state to occur, the system can save time by not having to wait for the first runtime state to arise naturally during the players' gameplay. This can be important, especially in situations in which the desired runtime state is an uncommon runtime state.

As an example, and with respect to a hockey video game, the first runtime state can correspond to a runtime state in which an attacking player is controlling the puck and is being defended by two defenders. During gameplay, a similar but not identical runtime state might occur. For instance, an attacking player may be controlling the puck while being defended by three defenders. Accordingly, to achieve the desired first runtime state, another defended can be removed from play so that it is not participating in the play to defend against the attacking player.

In another example, the first runtime state may require three defenders, when only two defenders are present. The third defender may or may not have been in an appropriate location or position to defend the attacking player. For example, the third defender may have already been beaten by the attacking player, or the third defender may have been on the other side of the ice. Accordingly, to trigger the first runtime state, the third defender can be controlled to manipulate the game rules of the game application (for example, as if the third defender is moving at an unreasonably fast pace or is teleported to the desired location or such that a team may have too many players, too many defenders, or the like). It will be understood that, in some cases, the desired runtime state can be triggered, even if the current runtime state is not similar to the desired runtime state.

In some cases, alters gameplay of the game application 110 to trigger the first runtime state of the game application 110 does not greatly affect the player's gaming experience. For example, in some cases, although the gameplay is being altered, the alteration may occur seamlessly such that the player, or an average player, remains unaware of the game alteration. In other cases, the alteration may not occur seamlessly such that the player notices the game alteration.

At blocks 410, 412, and 414, similar to blocks 310, 312, and 314 of FIG. 3, the user computing system 102 applies the exploratory rule set responsive to a determination that the runtime state of the game application is the first runtime state, collects game state data, and communicates the game state data.

At block 416, similar to block 316 of FIG. 3, the user computing system 102 applies a default rule set instead of, or in place of, the exploratory rule set.

It will be understood that the various blocks of process 400 can be implemented in a variety of orders, and that the user computing system 102 can implement one or more of the blocks concurrently or change the order, as desired. For example, the user computing system 102 can concurrently receive the first data packet, receive the second data, packet, or collect game state data. Similarly, the user computing system 102 can concurrently collect game state data and communicate the game state data.

It will be understood that the various steps described herein with respect to FIG. 4 can be implemented in a variety of orders, and that one or more of the steps of FIG. 4 can be implemented concurrently and/or the order changed, as desired. Furthermore, it will be understood that fewer, more, or different steps can be used as part of the routine of FIG. 4 For example, in some cases, certain steps can be omitted, such as, but not limited to, dashed blocks 404, 406, 410, 412, 414, or 416.

Overview of Computing System

Figure 5:
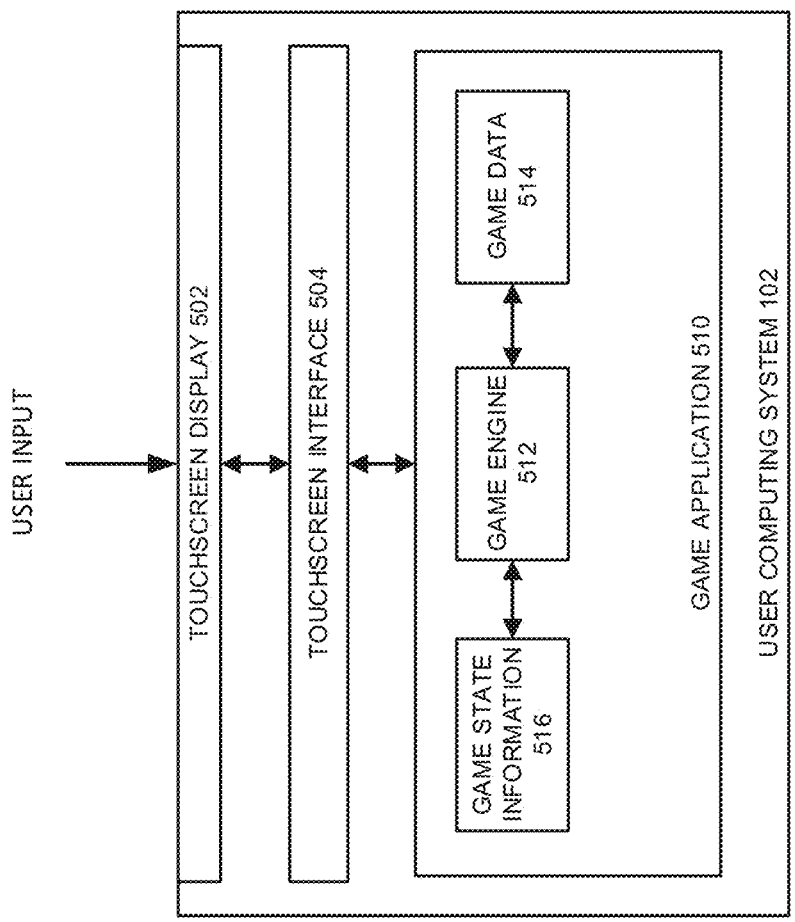
FIG. 5 illustrates an embodiment of a user computing system.

FIG. 5 illustrates an embodiment of a user computing system 102, which may also be referred to as a gaming system. As illustrated, the user computing system 102 may be a single computing device that can include a number of elements. However, in some cases, the user computing system 102 may include multiple devices. For example, the user computing system 102 may include one device that includes that includes a central processing unit and a graphics processing unit, another device that includes a display, and another device that includes an input mechanism, such as a keyboard or mouse.

The user computing system 102 can be an embodiment of a computing system that can execute a game system. In the non-limiting example of FIG. 6, the user computing system 102 is a touch-capable computing device capable of receiving input from a user via a touchscreen display 502. However, the user computing system 102 is not limited as such and may include non-touch capable embodiments, which do not include a touchscreen display 502.

The user computing system 102 includes a touchscreen display 502 and a touchscreen interface 504, and is configured to execute a game application 510. This game application may be the game application 110 or an application that executes in conjunction with or in support of the game application 110, such as a video game execution environment. Although described as a game application 510, in some embodiments the application 510 may be another type of application that may have a variable execution state based at least in part on the preferences or capabilities of a user, such as educational software. While user computing system 102 includes the touchscreen display 502, it is recognized that a variety of input devices may be used in addition to or in place of the touchscreen display 502.

The user computing system 102 can include one or more processors, such as central processing units (CPUs), graphics processing units (GPUs), and accelerated processing units (APUs). Further, the user computing system 102 may include one or more data storage elements. In some embodiments, the user computing system 102 can be a specialized computing device created for the purpose of executing game applications 510. For example, the user computing system 102 may be a video game console. The game applications 510 executed by the user computing system 102 may be created using a particular application programming interface (API) or compiled into a particular instruction set that may be specific to the user computing system 102. In some embodiments, the user computing system 102 may be a general purpose computing device capable of executing game applications 510 and non-game applications. For example, the user computing system 102 may be a laptop with an integrated touchscreen display or desktop computer with an external touchscreen display. Components of an example embodiment of a user computing system 102 are described in more detail with respect to FIG. 6.

The touchscreen display 502 can be a capacitive touchscreen, a resistive touchscreen, a surface acoustic wave touchscreen, or other type of touchscreen technology that is configured to receive tactile inputs, also referred to as touch inputs, from a user. For example, the touch inputs can be received via a finger touching the screen, multiple fingers touching the screen, a stylus, or other stimuli that can be used to register a touch input on the touchscreen display 502. The touchscreen interface 504 can be configured to translate the touch input into data and output the data such that it can be interpreted by components of the user computing system 102, such as an operating system and the game application 510. The touchscreen interface 504 can translate characteristics of the tactile touch input touch into touch input data. Some example characteristics of a touch input can include, shape, size, pressure, location, direction, momentum, duration, or other characteristics. The touchscreen interface 504 can be configured to determine the type of touch input, such as, for example a tap (for example, touch and release at a single location) or a swipe (for example, movement through a plurality of locations on touchscreen in a single touch input). The touchscreen interface 504 can be configured to detect and output touch input data associated with multiple touch inputs occurring simultaneously or substantially in parallel. In some cases, the simultaneous touch inputs may include instances where a user maintains a first touch on the touchscreen display 502 while subsequently performing a second touch on the touchscreen display 502. The touchscreen interface 504 can be configured to detect movement of the touch inputs. The touch input data can be transmitted to components of the user computing system 102 for processing. For example, the touch input data can be transmitted directly to the game application 510 for processing.

In some embodiments, the touch input data can undergo processing or filtering by the touchscreen interface 504, an operating system, or other components prior to being output to the game application 510. As one example, raw touch input data can be captured from a touch input. The raw data can be filtered to remove background noise, pressure values associated with the input can be measured, and location coordinates associated with the touch input can be calculated. The type of touch input data provided to the game application 510 can be dependent upon the specific implementation of the touchscreen interface 504 and the particular API associated with the touchscreen interface 504. In some embodiments, the touch input data can include location coordinates of the touch input. The touch signal data can be output at a defined frequency. Processing the touch inputs can be computed many times per second and the touch input data can be output to the game application for further processing.

A game application 510 can be configured to be executed on the user computing system 102. The game application 510 may also be referred to as a video game, a game, game code or a game program. A game application should be understood to include software code that a user computing system 102 can use to provide a game for a user to play. A game application 510 might include software code that informs a user computing system 102 of processor instructions to execute, but might also include data used in the playing of the game, such as data relating to constants, images and other data structures. For example, in the illustrated embodiment, the game application includes a game engine 512, game data 514, and game state data 118 516.

The touchscreen interface 504 or another component of the user computing system 102, such as the operating system, can provide user input, such as touch inputs, to the game application 510. In some embodiments, the user computing system 102 may include alternative or additional user input devices, such as a mouse, a keyboard, a camera, a game controller, and the like. A user can interact with the game application 510 via the touchscreen interface 504 or one or more of the alternative or additional user input devices. The game engine 512 can be configured to execute aspects of the operation of the game application 510 within the user computing system 102. Execution of aspects of gameplay within a game application can be based, at least in part, on the user input received, the game data 514, and game state data 118 516. The game data 514 can include game rules, prerecorded motion capture poses/paths, environmental settings, constraints, animation reference curves, skeleton models, or other game application information. Further, the game data 514 may include information that is used to set or adjust the difficulty of the game application 510.

The game engine 512 can execute gameplay within the game according to the game rules. Some examples of game rules can include rules for scoring, possible inputs, actions/events, movement in response to inputs, and the like. Other components can control what inputs are accepted and how the game progresses, and other aspects of gameplay. During execution of the game application 510, the game application 510 can store game state data 118 516, which can include character states, environment states, scene object storage, or other information associated with a state of execution of the game application 510. For example, the game state data 118 516 can identify the state of the game application at a specific point in time, such as a character position, character action, game level attributes, and other information contributing to a state of the game application.

The game engine 512 can receive the user inputs and determine in-game events, such as actions, collisions, runs, throws, attacks and other events appropriate for the game application 510. During operation, the game engine 512 can read in game data 514 and game state data 118 516 in order to determine the appropriate in-game events. In one example, after the game engine 512 determines the character events, the character events can be conveyed to a movement engine that can determine the appropriate motions the characters should make in response to the events and passes those motions on to an animation engine. The animation engine can determine new poses for the characters and provide the new poses to a skinning and rendering engine. The skinning and rendering engine, in turn, can provide character images to an object combiner in order to combine animate, inanimate, and background objects into a full scene. The full scene can conveyed to a renderer, which can generate a new frame for display to the user. The process can be repeated for rendering each frame during execution of the game application. Though the process has been described in the context of a character, the process can be applied to any process for processing events and rendering the output for display to a user.

Example Hardware Configuration of Computing System

Figure 6:
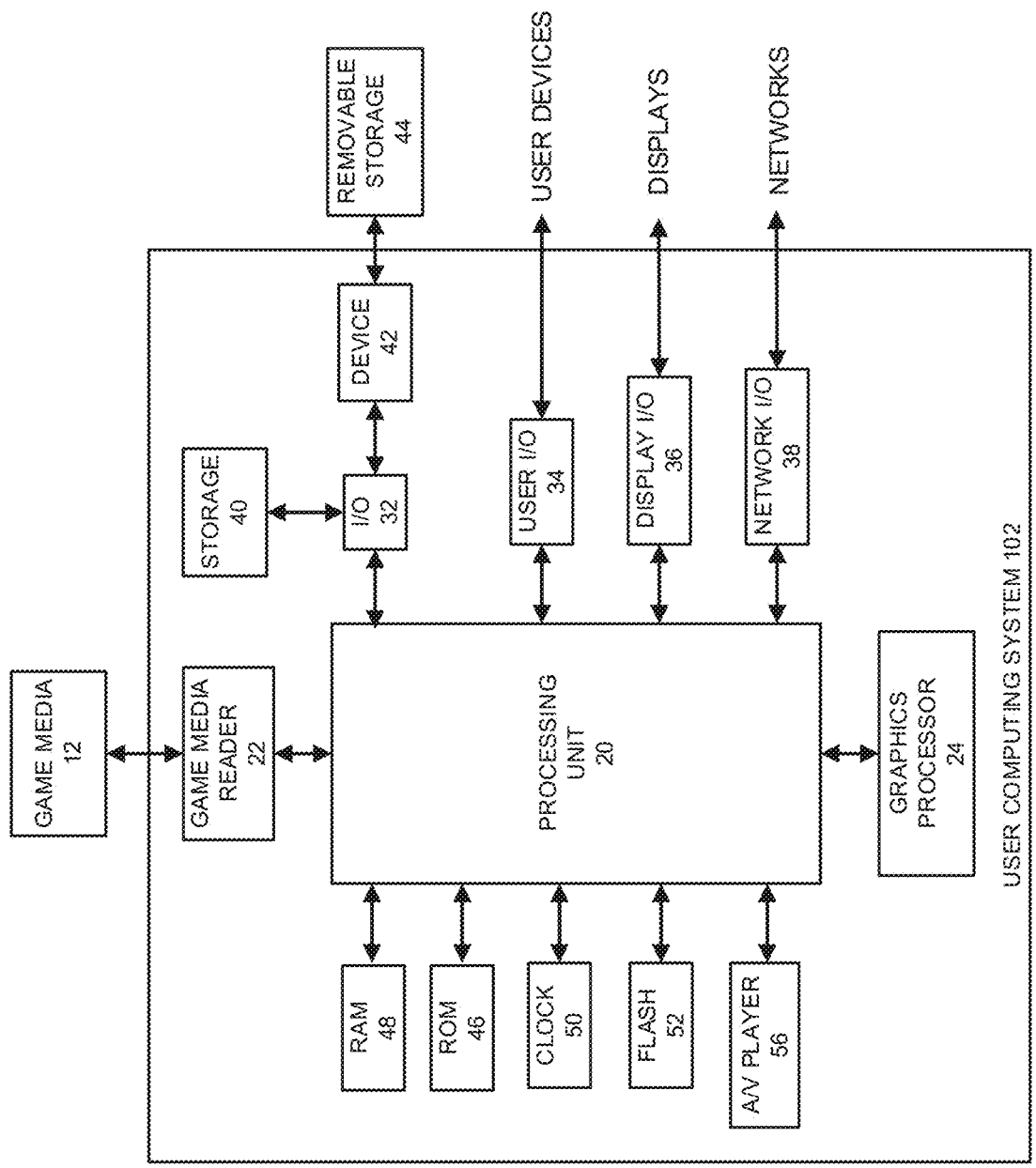
FIG. 6 illustrates an embodiment of a hardware configuration for the user computing system of FIG. 5.

FIG. 6 illustrates an embodiment of a hardware configuration for the user computing system 102 of FIG. 5. Other variations of the user computing system 102 may be substituted for the examples explicitly presented herein, such as removing or adding components to the user computing system 102. The user computing system 102 may include a dedicated game device, a smart phone, a tablet, a personal computer, a desktop, a laptop, a smart television, a car console display, and the like. Further, (although not explicitly illustrated in FIG. 6) as described with respect to FIG. 5, the user computing system 102 may optionally include a touchscreen display 502 and a touchscreen interface 504.

As shown, the user computing system 102 includes a processing unit 20 that interacts with other components of the user computing system 102 and also components external to the user computing system 102. A game media reader 22 may be included that can communicate with game media 12. Game media reader 22 may be an optical disc reader capable of reading optical discs, such as CD-ROM or DVDs, or any other type of reader that can receive and read data from game media 12. In some embodiments, the game media reader 22 may be optional or omitted. For example, game content or applications may be accessed over a network via the network I/O 28 rendering the game media reader 22 or the game media 12 optional.

The user computing system 102 may include a separate graphics processor 24. In some cases, the graphics processor 24 may be built into the processing unit 20, such as with an APU. In some such cases, the graphics processor 24 may share Random Access Memory (RAM) with the processing unit 20. Alternatively, or in addition, the user computing system 102 may include a discrete graphics processor 24 that is separate from the processing unit 20. In some such cases, the graphics processor 24 may have separate RAM from the processing unit 20. Further, in some cases, the graphics processor 24 may work in conjunction with one or more additional graphics processors or with an embedded or non-discrete graphics processing unit, which may be embedded into a motherboard and which is sometimes referred to as an on-board graphics chip or device.

The user computing system 102 also includes various components for enabling input/output, such as an I/O 22, a user I/O 24, a display I/O 26, and a network I/O 28. As previously described, the input/output components may, in some cases, including touch-enabled devices. The I/O 22 interacts with storage element 40 and, through a device 42, removable storage media 44 in order to provide storage for computing device 110. Processing unit 20 can communicate through I/O 22 to store data, such as game state data and any shared data files. In addition to storage 40 and removable storage media 44, computing device 110 is also shown including ROM (Read-Only Memory) 46 and RAM 48. RAM 48 may be used for data that is accessed frequently, such as when a game is being played.

User I/O 24 is used to send and receive commands between processing unit 20 and user devices, such as game controllers. In some embodiments, the user I/O 24 can include touchscreen inputs. As previously described, the touchscreen can be a capacitive touchscreen, a resistive touchscreen, or other type of touchscreen technology that is configured to receive user input through tactile inputs from the user. Display I/O 26 provides input/output functions that are used to display images from the game being played. Network I/O 28 is used for input/output functions for a network. Network I/O 28 may be used during execution of a game, such as when a game is being played online or being accessed online.

Display output signals may be produced by the display I/O 26 and can include signals for displaying visual content produced by the computing device 110 on a display device, such as graphics, user interfaces, video, or other visual content. The user computing system 102 may include one or more integrated displays configured to receive display output signals produced by the display I/O 26, which may be output for display to a user. According to some embodiments, display output signals produced by the display I/O 26 may also be output to one or more display devices external to the computing device 110.

The user computing system 102 can also include other features that may be used with a game, such as a clock 50, flash memory 52, and other components. An audio/video player 56 might also be used to play a video sequence, such as a movie. It should be understood that other components may be provided in the user computing system 102 and that a person skilled in the art will appreciate other variations of the user computing system 102.

Program code can be stored in ROM 46, RAM 48, or storage 40 (which might include hard disk, other magnetic storage, optical storage, solid state drives, or other non-volatile storage, or a combination or variation of these). At least part of the program code can be stored in ROM that is programmable (ROM, PROM, EPROM, EEPROM, and so forth), in storage 40, or on removable media such as game media 12 (which can be a CD-ROM, cartridge, memory chip or the like, or obtained over a network or other electronic channel as needed). In general, program code can be found embodied in a tangible non-transitory signal-bearing medium.

Random access memory (RAM) 48 (and possibly other storage) is usable to store variables and other game and processor data as needed. RAM is used and holds data that is generated during the play of the game and portions thereof might also be reserved for frame buffers, game state or other data needed or usable for interpreting user input and generating game displays. Generally, RAM 48 is volatile storage and data stored within RAM 48 may be lost when the user computing system 102 is turned off or loses power.

As user computing system 102 reads game media 12 and provides a game, information may be read from game media 12 and stored in a memory device, such as RAM 48. Additionally, data from storage 40, ROM 46, servers accessed via a network (not shown), or removable storage media 46 may be read and loaded into RAM 48. Although data is described as being found in RAM 48, it will be understood that data does not have to be stored in RAM 48 and may be stored in other memory accessible to processing unit 20 or distributed among several media, such as game media 12 and storage 40.

Additional Embodiments

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (for example, not all described acts or events are necessary for the practice of the algorithms). Moreover, in certain embodiments, acts or events can be performed concurrently, for example, through multi-threaded processing, interrupt processing, or multiple processors or processor cores or on other parallel architectures, rather than sequentially. In addition, different tasks or processes can be performed by different machines or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, for example, a combination of a DSP and a microprocessor, a plurality of microprocessors, one or more microprocessors in conjunction with a DSP core, or any other such configuration. Although described herein primarily with respect to digital technology, a processor may also include primarily analog components. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without user input or prompting, whether these features, elements or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (for example, X, Y, or Z). Thus, such disjunctive language is not generally intended to, and should not, imply that certain embodiments require at least one of X, at least one of Y, or at least one of Z to each be present.

Any process descriptions, elements or blocks in the flow diagrams described herein or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure.

What is claimed is:

1. A computer implemented method for managing updates of rule sets of non-player characters comprising:
    monitoring gameplay of a game application during runtime of the game application, wherein the game application comprises game data, the game data comprising (i) a plurality of rule sets for defining actions to be performed by one or more non-player characters of the game application during a first during the runtime of the game application, and (ii) a plurality of data collection rules defining types of game state data to collect and when to collect game state data during the runtime of the game application;
    obtaining a first exploratory rule set defining one or more first actions to be performed by the one or more non-player characters, the first exploratory rule set being different than at least one of the plurality of rule sets;
    identifying, during the monitoring, an occurrence of a first triggering game state during the runtime of the game application, the identifying being based on defined game conditions within the game application;
    responsive to the identifying of the occurrence of the first triggering game state, applying the first exploratory rule set during the runtime of the game application causing the one or more non-player characters to perform the one or more first actions;
    collecting, based on the plurality of data collection rules, first game state data during a first runtime state of the game application in which the exploratory rule set has been applied to the one or more non-player characters, the first game state data indicating gameplay behaviors of a player-controlled character in response to the application of the first exploratory rule set during the first runtime state;
    generating feedback based on the first game state data, the feedback resulting from an evaluation of the application of the first exploratory rule set during the first runtime state; and
    updating the plurality of rule sets in response to the first game state data and the feedback.

2. The method of claim 1 wherein the first game state data collected during the first runtime state includes simulation data.

3. The method of claim 1,
    wherein the plurality of data collection rules is provided to the game application over a network as one or more data packets.

4. The method of claim 1, wherein the first exploratory rule set includes one or more second actions to be performed by the one or more non-player characters.

5. The method of claim 1, wherein the first exploratory rule set is provided to the game application over a network as one or more data packets.

6. The method of claim 1, wherein the managing of the updates of rule sets of non-player characters is performed at a plurality of gameplay sessions, wherein the updating of the plurality of rule sets is performed in response to the collecting of a plurality of first game state data from the plurality of gameplay sessions.

7. The method of claim 1, wherein the first exploratory rule set is updated based at least in part on the first game state data.

8. The method of claim 1, further comprising altering gameplay of the game application to trigger the first runtime state of the game application.

9. A system for managing updates of rule sets of non-player characters comprising:
    one or more processors configured with computer-readable instructions to:
    monitor gameplay of a game application during runtime of the game application, wherein the game application comprises game data, the game data comprising (i) a plurality of rule sets defining actions to be performed by one or more non-player characters of the game application during the runtime of the game application and (ii) a plurality of data collection rules defining types of game state data to collect and when to collect game state data during the runtime of the game application;
    obtain a first exploratory rule set defining one or more first actions to be performed by the one or more non-player characters, the first exploratory rule set being different than at least one of the plurality of rule sets;
    identify, during the monitoring, an occurrence of a first triggering game state during the runtime of the game application, the identifying being based on defined game conditions within the game application;
    responsive to identification of the occurrence of the first triggering game state, apply the first exploratory rule set during the runtime of the game application causing the one or more non-player characters to perform the one or more first actions;
    collect, based on the plurality of data collection rules, first game state data during a first runtime state of the game application in which the first exploratory rule set has been applied to the one or more non-player characters, the first game state data indicating gameplay behaviors of a player-controlled character in response to the application of the first exploratory rule set during the first runtime state;
    generate feedback based on the first game state data, the feedback resulting from an evaluation of the application of the first exploratory rule set during the first runtime state; and
    update the plurality of rule sets in response to the first game state data and the feedback.

10. The system of claim 9, wherein the first game state data collected during the first runtime state includes simulation data.

11. The system of claim 9, wherein the plurality of data collection rules is provided to the game application over a network as one or more data packets.

12. The system of claim 9, wherein the first exploratory rule set includes one or more second actions to be performed by the one or more non-player characters.

13. The system of claim 9, wherein the managing of the updates to the rule sets of the non-player characters is performed at a plurality of gameplay sessions, wherein the updating of the plurality of rule sets is performed in response to the collecting of a plurality of first game state data from the plurality of gameplay sessions.

14. The system of claim 12, wherein the one or more processor are further configured to, during the runtime of the game application, alter gameplay of the video game to trigger the first runtime state of the video game.

\* \* \* \* \*